Oct. 30, 1962    M. STENGER    3,060,705
DEVICE FOR THE ELIMINATION OF NOISE IN
AUTOMOBILE VEHICLE TRANSMISSIONS
Filed March 14, 1960    7 Sheets-Sheet 1

INVENTOR
MAXIMILIEN STENGER
BY Irvin S. Thompson
ATTY.

Oct. 30, 1962 M. STENGER 3,060,705
DEVICE FOR THE ELIMINATION OF NOISE IN
AUTOMOBILE VEHICLE TRANSMISSIONS
Filed March 14, 1960 7 Sheets-Sheet 2

INVENTOR
MAXIMILIEN STENGER
By Irwin S. Thompson
ATTY.

Oct. 30, 1962

M. STENGER 3,060,705

DEVICE FOR THE ELIMINATION OF NOISE IN
AUTOMOBILE VEHICLE TRANSMISSIONS

Filed March 14, 1960

INVENTOR
MAXIMILIEN STENGER
By Irwin S. Thompson
ATTY.

FIG:10
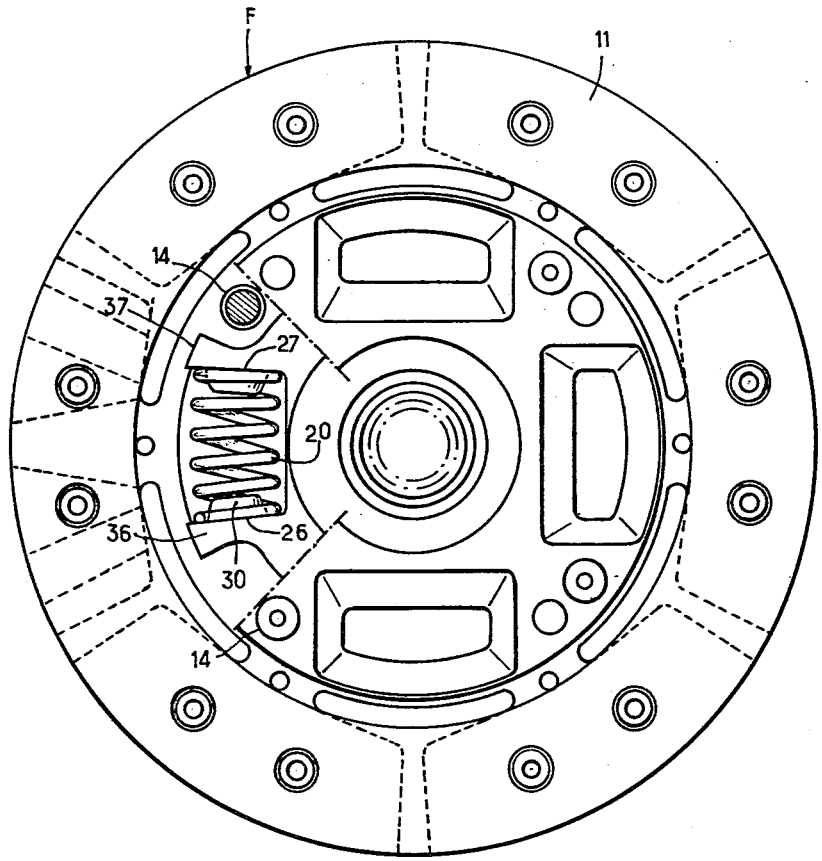
FIG:11
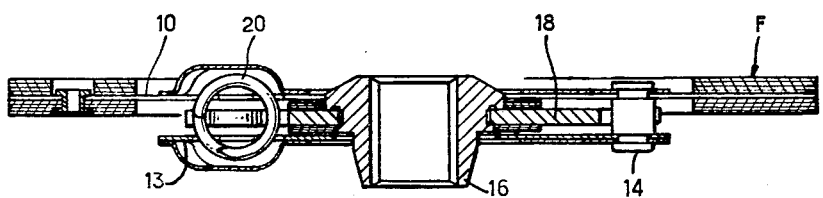
INVENTOR
MAXIMILIEN STENGER
BY Irwin S. Thompson
ATTY.

FIG:12
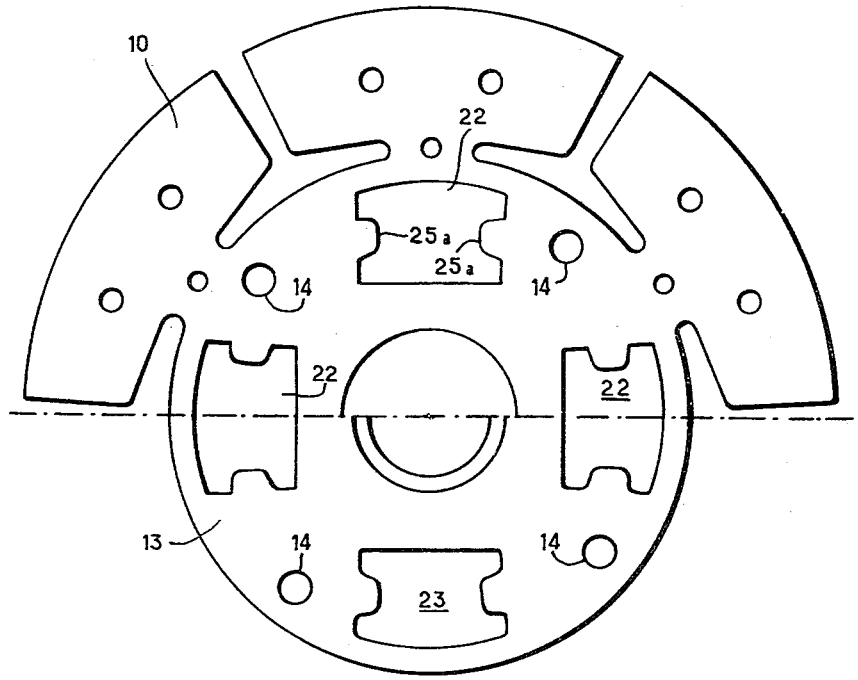
FIG:13
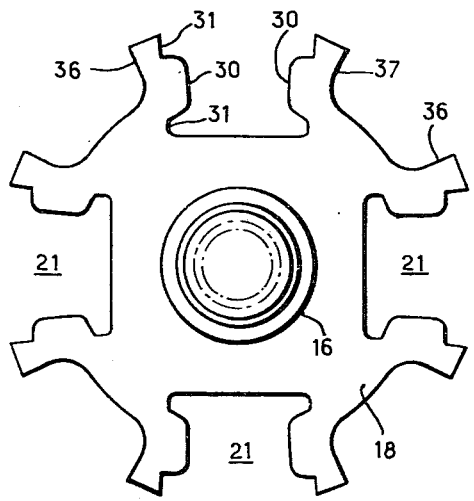

Oct. 30, 1962     M. STENGER     3,060,705
DEVICE FOR THE ELIMINATION OF NOISE IN
AUTOMOBILE VEHICLE TRANSMISSIONS

Filed March 14, 1960     7 Sheets-Sheet 6

INVENTOR
MAXIMILIEN STENGER
BY Irvin J. Thompson
ATTY.

Oct. 30, 1962 M. STENGER 3,060,705
DEVICE FOR THE ELIMINATION OF NOISE IN
AUTOMOBILE VEHICLE TRANSMISSIONS
Filed March 14, 1960 7 Sheets-Sheet 7
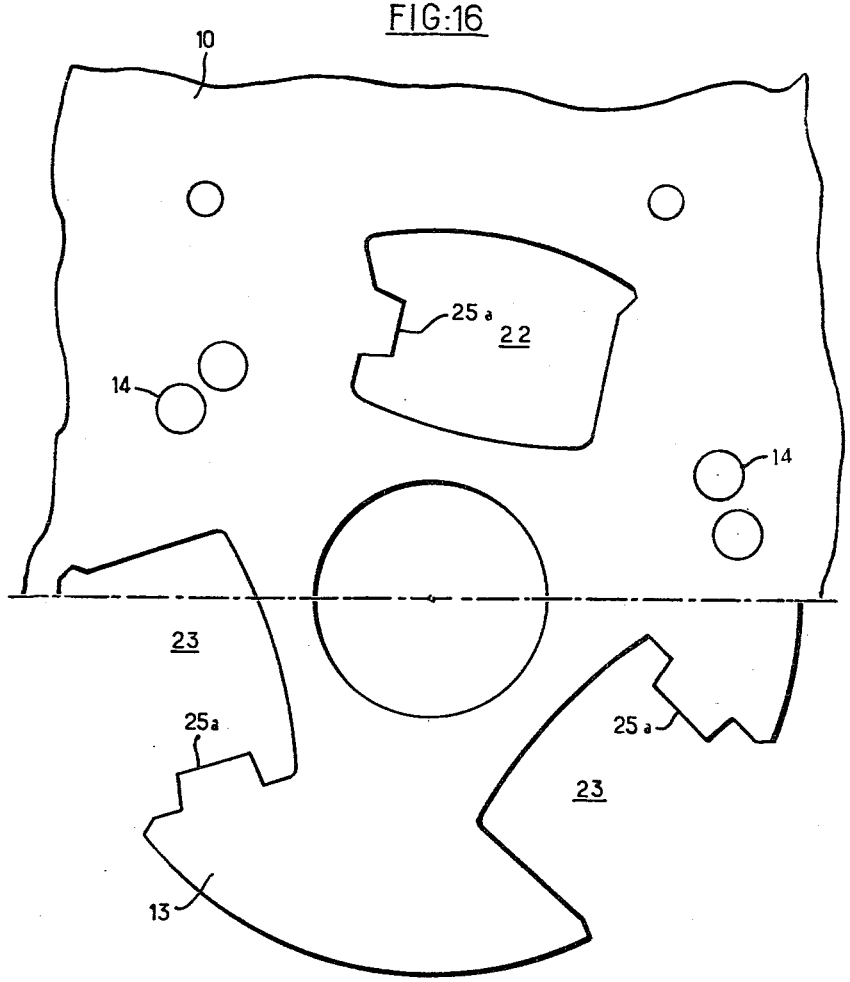
FIG:16
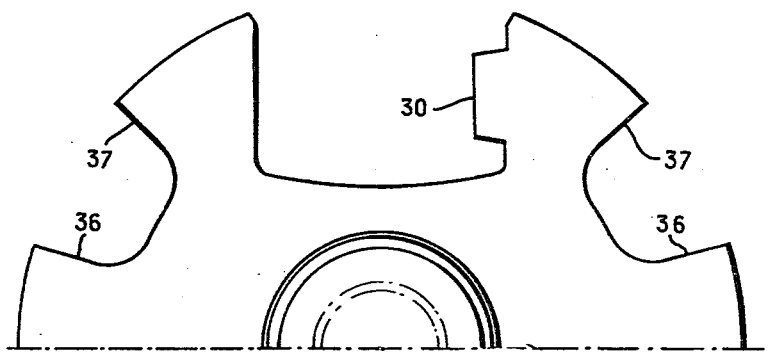
FIG:17
INVENTOR
MAXIMILIEN STENGER United States Patent Office 3,060,705
Patented Oct. 30, 1962

3,060,705
DEVICE FOR THE ELIMINATION OF NOISE IN AUTOMOBILE VEHICLE TRANSMISSIONS
Maximilien Stenger, Paris, France, assignor to Société Anonyme Francaise du Ferodo, Paris, France, a corporation of France
Filed Mar. 14, 1960, Ser. No. 14,621
Claims priority, application France Mar. 18, 1959
9 Claims. (Cl. 64—27)

In automobile vehicle transmission systems, it is sometimes found, either during a driving effort or while using the engine as a brake, but in any case when the clutch is fully engaged, that is to say outside the period of slip of the clutch, that parasitic noises having a distinctive metallic resonance, are produced. These noises are referred to by the term "trash." This phenomenon does not appear on all automobile vehicles, but it can become apparent even on vehicles having transmissions equipped for the purpose of silent running, with a clutch friction plate of the torsion-absorption type, comprising a lining-holder disc, a counter-disc fixed to the lining disc by spacing columns, a hub having a web which stretches between the said discs and is provided with slots through which said columns pass, washers for axially positioning said web with respect to the said discs, elastic torsion-damping means (springs, blocks of rubber or the like) housed in notched portions of the said web and in windows formed in said discs, and, when so required, friction means between the discs and the hub.

As a result of various tests, the applicants have observed that the trash phenomenon is caused by the initiation by the engine of vibrations in the transmission and is accompanied by considerable variations in torque about a mean value. The applicants have discovered that this trash phenomenon offers no serious disadvantages in practice, except for values of the mean driving torque which are clearly displaced with respect to zero torque, either in the forward running direction in certain vehicles or when running in reverse in others.

In addition, the applicants have discovered that the displacement with respect to zero torque of the mean torque for which the trash phenomenon is particularly troublesome, can be attributed, at least to a certain extent, to certain mechanical characteristics inherent to the vehicles considered, either of an asymmetrical and/or non-linear nature, such as helicoidal teeth, inertia of the elastically-suspended engine block, transmission members of rubber-like materials, etc. Furthermore, in the case in which the torque passes to zero during the course of the above-mentioned torque variations, the effect of any play in the transmission is to reduce the variations of torque in the sense towards which the latter becomes zero, so that the oscillations are almost always located definitely on the other side, which corresponds, depending on the vehicle, either to direct, forward-motion torques, or to torques when travelling in reverse.

This asymmetry has led the applicants to provide, with success in accordance with the present invention, limits of movement on the friction plates, which limits correspond to the maximum transmissible reverse and forward torques, and are definitely asymmetric with respect to a position which corresponds to the transmission of zero torque. This asymmetry can even be accentuated up to the point of displacing the whole limit of travel to one side only of this position, abutments being provided in order that the damping springs have to act, depending on the vehicle, only in the case of negative torques transmitted, or on the contrary only for positive torques transmitted. This displacement of the limits of movement to one side of the zero position makes it possible, in the case of a device with damping springs, to employ springs which have only a small rigidity, without the use of these springs resulting in prohibitive overall dimensions.

The present invention has for its object a device for the elimination of trash noises in automobile vehicle transmissions of the type comprising elastic shock-absorber means, acting especially between the disc and counter-disc assembly of a friction-plate and the web of the hub of the said friction-plate, this device being arranged in such manner as to take into account the conditions referred to above.

The device in accordance with the present invention is more particularly characterized in that, within the range of the positive or negative engine torques which give rise to trash phenomena, the said elastic shock-absorber means have very low rigidity accompanied by a substantial angular range of total displacement, and in that this total displacement is controlled by abutments which, starting from a position of rest, define a fraction of this range of displacement in one direction starting from the position of rest, the said fraction being considerably greater than the remaining fraction in the other direction.

This feature, together with other characteristic features of the invention and their advantages will further be brought out in the description which follows below of forms of construction chosen by way of example only and without any sense of limitation, reference being made to the accompanying drawings, in which:

FIG. 10 is a view similar to FIG. 1, but relating to a further alternative form of clutch friction-plate;

FIG. 11 is a view in cross-section of the friction-plate of FIG. 10;

FIG. 12 is an upper half-view in elevation of the large lining-carrier disc of the friction-plate of FIG. 10 and a lower half-view in elevation of the small counter-disc;

FIG. 13 is a view in elevation of the hub of the friction-plate of FIG. 10;

FIG. 16 is an upper half-view in elevation, with a portion broken away, of the large lining-carrier-disc of the friction-plate of FIG. 14, and a lower half-view of the small counter-disc;

FIG. 17 is a half-view in elevation of the hub of the friction-plate of FIG. 14.

Figure 1:
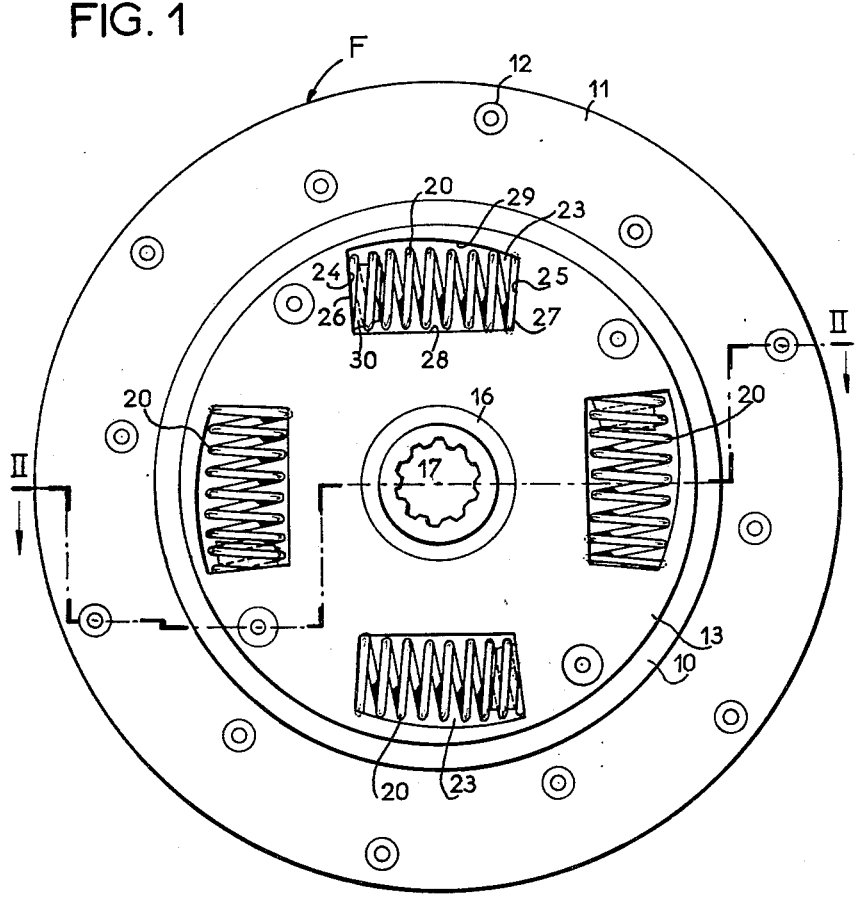
FIG. 1 is a view in elevation of a clutch friction plate in accordance with the invention.
Figure 2:
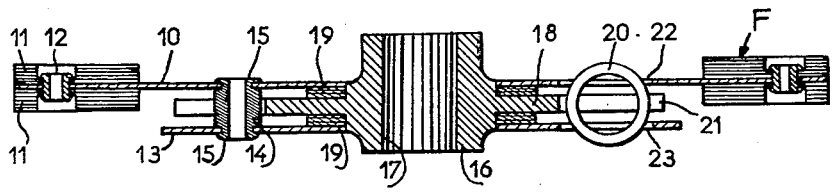
FIG. 2 is a view of this friction plate in cross-section, taken along the broken line II—II of FIG. 1.

Reference will first be made to FIGS. 1 and 2, in which a clutch friction-plate F is shown. This friction-plate is composed of: a large disc 10 which is provided at its periphery and on its two faces with friction linings 11 riveted at 12 and having any appropriate shape; a small counter-disc 13 which is rigidly fixed to the large disc 10 by means of small spacing pillars 14 riveted at 15 to the discs 10 and 13; a hub 16 which is provided on the one hand with a central boss having a splined bore 17 and on the other hand with a web 18 extending between the discs 10 and 13; two washers 19 interposed between the web 18 and the discs 10 and 13; and a number of springs 20, referred to as torsion-damping springs, which are each housed in a notched portion 21 of the web 18 and in two oppositely-facing windows 22 and 23 respectively formed in the discs 10 and 13.

Figure 8:
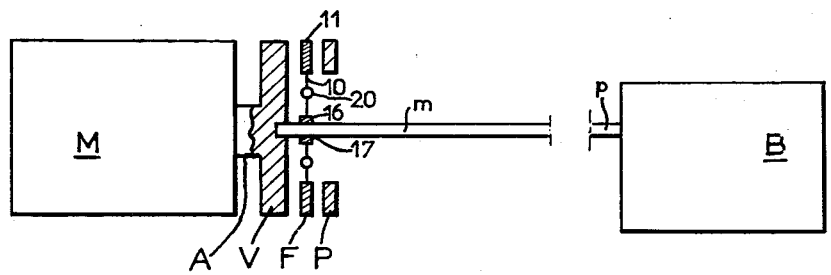
FIG. 8 is a diagram of an automobile vehicle transmission, the clutch of which is provided with a friction-plate in accordance with the invention.
Figure 14:
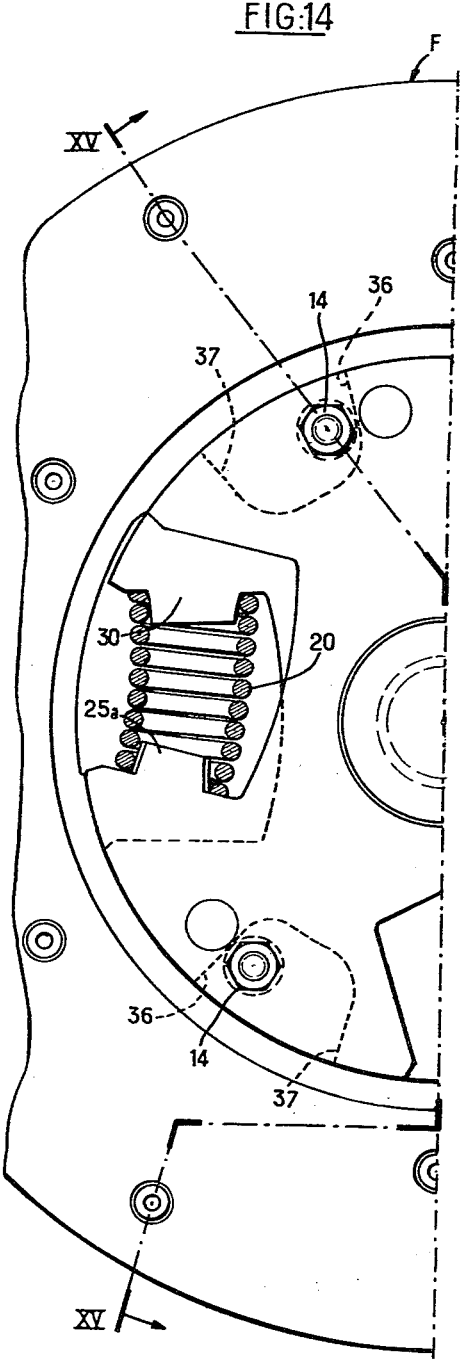
FIG. 14 is a half-view in elevation, with parts broken away, of a further alternative form of friction-plate.
Figure 15:
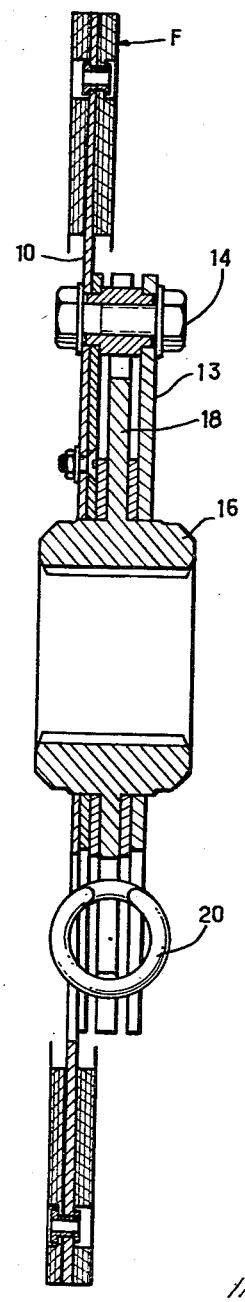
FIG. 15 is a corresponding view of this friction-plate in cross-section, taken along the broken line XV—XV of FIG. 14.

A friction-plate F of this type is especially intended for use in an automobile vehicle transmission system, an example of which is shown diagrammatically in FIG. 8. In this figure, the engine of the vehicle can be seen at M, while the engine crank-shaft A carries the fly-wheel V of the clutch. The linings 11 of the disc 10 of the friction-plate F are intended to be clamped between the fly-wheel V and a pressure-plate P, which can be operated either by hand or automatically. The splined bore 17 of the hub 16 of the friction-plate F is rigidly fast for rotation with the driven shaft $m$ of the clutch. The shaft $m$ which is centered in the fly-wheel V, constitutes or drives the primary shaft $p$ of the gear-box B, the secondary shaft of which serves to drive the driving wheels of the vehicle. In the example illustrated, the transmission is of the type in which the shaft $m$ is of a substantial length.

When the arrangement and the characteristics of the various parts of the friction-plate F are those of the friction-plates generally employed up to the present time, the noises which are referred to by the name of "trash" are especially observed during operation with the engine acting as a brake, that is to say when the momentum of the vehicle drives the engine.

The applicants have determined by tests that the trash phenomenon consists of a torsional vibration of the assembly constituted by the hub 16, the shaft $m$, the shaft $p$ and the pinion of the gear-box B, this vibration being maintained by the cyclic variations of torque of the engine M and thereby causing noise due to take-up of play in the gear-box B at each half alternation of the vibration. According to the invention, in order to eliminate or very considerably reduce the trash phenomenon, means are provided which consist in considerably reducing the friction torque between the portions 10, 13 and the portion 16 of the friction-plate F, and also of considerably reducing the rigidity of the springs 20 whilst safety abutments are provided between the said portions so as to reserve practically the whole of the relative angular travel of these latter, the length chosen for this travel being in any case very large within the limits of the ranges of torque at which the trash phenomenon is liable to occur.

Described in a more detailed manner, the means for reducing the friction between the portions 10, 13 and the portion 16 consists on the one hand in abutment and spacing washers 19 having a low coefficient of friction and/or being free from any gripping action between the web 18 and the discs 10 and 13, it being possible to achieve this latter condition by means of small pillars 14 of sufficient height, and consisting on the other hand in a particular assembly of the springs 20.

Figure 3:
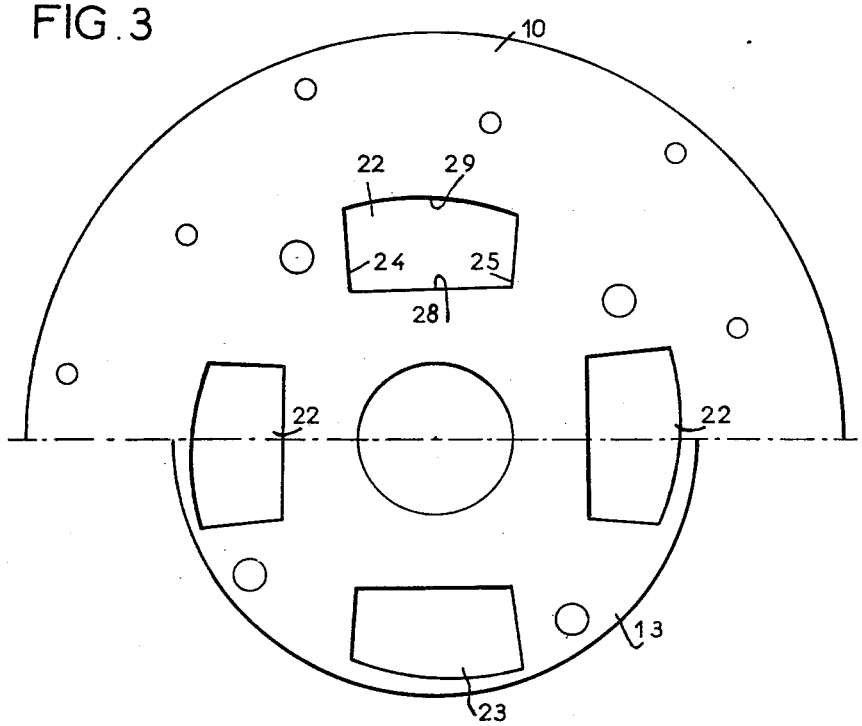
FIG. 3 is an upper half-view in elevation of the large lining-holder disc of the friction-plate, and a lower half-view in elevation of the small counter disc of the friction-plate.

In accordance with this assembly, each window 22 or 23 (FIGS. 1 and 3) has a transverse terminal side 24 which is definitely higher than the opposite side 25. The extremity 26 of the spring 20 which corresponds to the wider side 24 thus has a clearance with respect to the two longitudinal sides 28 and 29 of the window, and this clearance exists along the whole length of the spring 20, except at the other extremity 27 of the spring 20, which is located axially and radially in the shorter terminal side 25 of the window. The longitudinal side 28 which is nearest to the centre of the disc may be rectilinear; the other longitudinal side 29 is preferably rounded in the form of an arc of a circle which is eccentric with respect to the centre of the disc, in order to ensure the difference of heights of the sides 24 and 25.

The extremity 26 of the spring 20 (FIGS. 1 and 4) is engaged around a nose 30 of the recessed portion 21 of the web 18 of the hub 16 and is arranged to rest on two bearing surfaces 31 on the edge of the nose 30, while the other extremity 27 of the spring 20 can simply rest on a bearing surface 32 of the recessed portion 21. The bottom of the notched portion 21 can be seen at 33. The sides 31, 32 and 33 of the notched portion have substantially the same profile as the sides 24, 25 and 28 of the window 22 or 23.

With this arrangement, the extremity 26 of the spring 20 is maintained axially and radially by the nose 30 only of the web 18 of the hub, while the extremity 27 of the spring 20 is solely held by the shortened sides 25 of the windows 22 and 23 of the discs 10 and 13, the moving part of the spring not being able to rub either on the sides of the notched portions 21 or on the sides of the windows 22 and 23. The spring 20 is designed to have a low rigidity, substantially less than the rigidity normally adopted up to the present time in the case of torsion-damping springs which are applicable to engines of the same power and/or of the same torque, mounted on transmissions which are not subject to the trash phenomenon, and for example of the order of one-third to one-fifth of that rigidity.

In order to give an idea, it can be stated that good results have been obtained with a rigidity of 0.15 mk. per degree for the complete set of springs 20 with a transmission in which the trash phenomenon occurs in reverse for driving torques of $-2$ mk. to zero and in forward running under power from zero to $+1$ mk. The spring 20 is engaged in its housing at 21—22—23 with a very slight pre-stress corresponding to a torque less than 0.3 mk.

Generally speaking, in accordance with the invention, the rigidity of the springs 20 is reduced to less than 50% and preferably to about 15% of that which would usually be adopted, all other things being equal. The rigidity in accordance with the invention, evaluated in mk. per degree, is advantageously comprised between 1.5% and 7%, and preferably in the vicinity of 2.5% of the maximum driving torque. In the case of a trash phenomenon which is liable to occur with driving torques ranging from $-3$ mk. to $+1$ mk., the rigidity is comprised with advantage between 0.10 mk. and 0.40 mk. Such a rigidity is furthermore fixed at the maximum value at which the trash phenomenon is no longer perceptible. The range of displacements between the portion 16 and the portions 10, 13, are greater than 15° and of the order of 20°, that is to say more than double the total displacement normally provided. The range of displacement in the forward direction, which is limited by an abutment for a torque of about 1 mk., can be of the order of one-third of the displacement range in the reverse direction. Such an asymmetry of the displacement range in one direction or in the other constitutes an essential characteristic of the invention. The work of the shock-absorber is thus restricted with advantage to the torque ranges in which the trash phenomenon is liable to occur. The friction between the part 16 and the parts 10, 13 is reduced to less than 10% and even 5% of the maximum driving torque, and is for example less than 0.2 mk.

Figure 4:
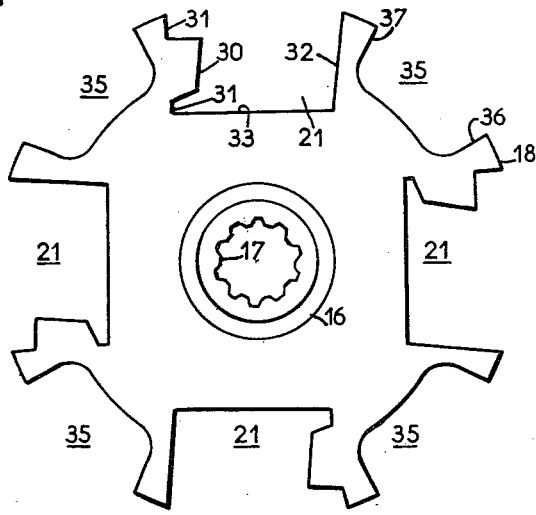
FIG. 4 is a view in elevation of the hub of the friction-plate.
Figure 5:
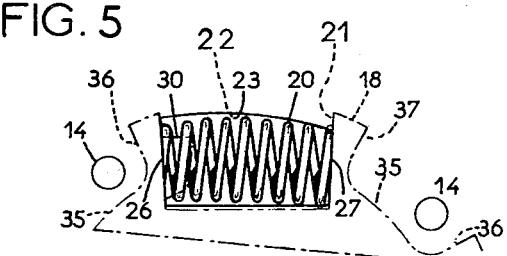
FIG. 5 shows diagrammatically the relative positions of the discs and the hub when the torque transmitted by the torsion-damping springs is substantially zero.

When the torque transmitted by the springs 20 is substantially zero, the position of the parts is that which is shown diagrammatically in FIG. 5. Each spring 20 is not subjected to any deformation and the notched portion 21 of the hub 16 remains opposite the pair of corresponding windows 22 and 23. In this position of rest, note will be taken of the position occupied by the pillars 14 which are rigidly fixed to the pair of discs 10 and 13 and engaged in elongated slots 35 formed in the web 18. Each slot 35 is alternated with a notched portion 21 of the web 18, following a circular symmetry (FIG. 4). The pillar 14 (FIG. 5) forms an abutment intended to co-operate with at least one of the sides 36 and 37 of the slot 35, and is spaced apart both from the side 36 and from the side 37 of the slot 35 in the position of rest. It will be observed in FIG. 5 that this particular spacing of the pillar 14 is essentially smaller with respect to the side 36 than to the side 37. Good results have been obtained with an angular travel of about 5° between the pillar 14 and the side 36 and with an angular travel of about 18° between the pillar 14 and the side 37.

Figure 6:
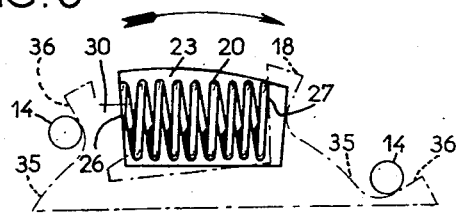
FIG. 6 is similar to FIG. 5, but shows the position of the members when the springs transmit an appreciable torque in the forward direction.

When a not-negligible torque is transmitted by the spring 20 in the forward direction, that is to say from the portion 10—13—14 driven by the engine M to the portion 16—18 which drives the shaft $m$, which is what occurs when the engine effectively drives the vehicle, each window 22, 23 thrusts the extremity 26 of the spring 20 towards the right-hand side of FIG. 5, and this thrust is transmitted by the other extremity 27 of the spring 20 to the web 18, while the spring 20 is compressed. This compression (FIG. 6) results in an angular travel of the part 10, 13 and 14 with respect to the part 16—18 which tends to bring the pillar 14 nearer to the side 36 of the slot 35. Upwards of a torque transmitted in the forward direction which is sufficiently high and is chosen with advantage in the vicinity of one-sixth of the maximum driving torque at full opening, the pillar 14 abuts against the side 36. A positive coupling is thereafter ensured between the parts 10, 13 and 14 and 16—18. It will be observed that in the position of abutment of FIG. 6, the extremity 26 of the spring 20 remains engaged on the nose 30 so as to permit the assembly to return to the position of rest without hindrance.

Figure 7:
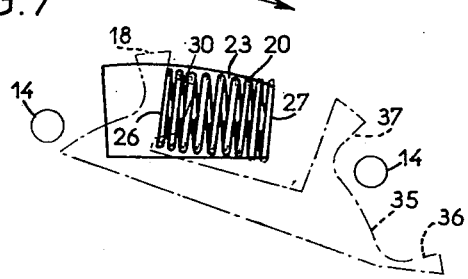
FIG. 7 is again similar to FIG. 5, but shows the positions of the members when the springs transmit an appreciable torque in the reverse direction.

When a not-negligible torque is transmitted by the springs 20 in the reverse direction, that is to say from the part 16—18 coupled to the shaft $m$ to the part 10, 13 and 14 coupled to the engine M, during the operation of the engine as a brake, the web 18 pushes the extremity 26 of the spring 20 with its nose 30 towards the right-hand side of FIG. 5, and this thrust is transmitted by the other extremity 27 of the spring 20 to the web 18, while the spring 20 is compressed. This compression (FIG. 7) results in an angular travel of the part 10, 13 and 14 with respect to the part 16—18 which tends to bring the pillar 14 closer to the side 37 of the slot 35. However, as has been explained above, the travel between the pillar 14 and the side 37 is very large. It is such that, even with the small rigidity of the spring 20, the pillar 14 does not come into abutment with the side 37 under normal conditions of operation in reverse.

With the arrangement which has just been described, all trash noise is eliminated during working in reverse sense, and the performances of the transmission are excellent in all other respects, under all conditions of operation.

Figure 9:
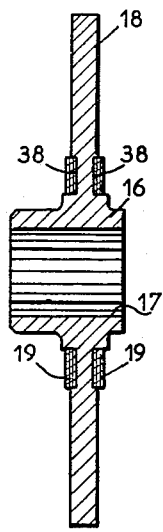
FIG. 9 is a view in cross-section of an alternative form of the hub of the clutch friction-plate.

In the alternative form shown in FIG. 9, the hub 16 is provided with a reinforced thickness of the web 18 so as to give great strength to the peripheral portion of this web, the extent of which in plan is reduced by the presence of the notches 21 and 35. In order to leave a small distance between the discs 10 and 13, grooves 38 are formed in the web 18 in the vicinity of the boss 16, and are intended to receive the washers 19. The latter are thicker than the depth of the grooves 38 so that they project from each side beyond the web 18 so that eventually the discs 10 and 13 are applied against the washers, in particular following the operations of engaging the clutch.

In a further alternative form (FIGS. 10 to 13), the arrangement is similar to that which has been described with reference to FIGS. 1 to 8, but each spring 20, the extremity 26 of which is always engaged round the nose 30 of the notch 21 in the web 18 of the hub 16 and can rest on the two bearing surfaces 31 along the edges of the nose 30, is no longer maintained at its other extremity 27 by the shortened sides 25 of the windows 22 and 23 of the discs 10 and 13. In this case, this other extremity 27 is no longer maintained by its outside, but by the inside by engagement of the windows 22 and 23 around the noses 25a. To this end, the springs 20 have a large diameter. It will be seen in FIG. 12 that the noses 25a are provided not only on the side of the extremity 27 of the spring 20, but also on the side of the extremity 26 of the said spring 20, while in FIG. 13, the nose 30 is also provided for each of the said extremities.

It will also be observed from FIGS. 10 and 12 that the abutment pillars 14 are always arranged in an asymmetrical manner with respect to the bearing surfaces 36 and 37 with which they are intended to co-operate, in accordance with an essential arrangement of the invention having for its object to displace the large travel of the springs 20 into the useful range for preventing trash noise. In FIG. 10, it will be noted that the pillar 14 is closer to the surface 37 than to the surface 36 in the position of rest, whereas in FIG. 5, the reverse arrangement was provided. This is due to the fact that in the example illustrated in FIGS. 10 to 13, it has been assumed that the friction is intended to prevent the appearance of trash when this phenomenon appears in the forward direction and not in the reverse direction, as was the case in FIGS. 1 to 8. It will be appreciated that in both cases, the travel of the hub 16 with respect to the discs 10 and 13 remains asymmetrical, especially in the direction of displacement. In a still further alternative form (FIGS. 14 to 17), the arrangement is again similar to those which have been described with reference to FIGS. 1 to 8 or with reference to FIGS. 10 to 13, and there can again be seen at 20 the springs interposed between the hub 18 and the discs 10—13. The spring 20 is always centered at its two extremities by the interior, as in FIGS. 10 to 13, and there is shown at 30 the nose of the web 18 of the hub 16 intended to centre one of the extremities of the spring 20, and at 25a the noses of the windows 22 and 23 of the discs 10 and 13, in order to centre the other extremity of the said spring.

As in the previous cases, the abutment pillars 14 are arranged in an asymmetrical manner with respect to the bearing surfaces 36 and 37. In the example of FIGS. 14 to 17, this asymetry is of the kind shown in FIGS. 1 to 8, that is to say with a pillar 14 closer at rest to the edge 36 than to the edge 37, in order to eliminate a trash noise liable to appear in reverse. It will be observed from FIG. 14 that the pillar 14 is even substantially in contact with the edge 36 instead of having a very small clearance from it as was the case in FIG. 5.

What I claim is:

1. A damper device for the elimination of trash noises in a friction disc having a pair of disc elements axially spaced from each other and rigid with each other, a friction lining supported by one of said disc elements, a hub mounted angularly movable with respect of said disc elements and having a web portion extending between said disc elements, windows in said disc elements, notches in said web portion, springs housed in said windows and in said notches for defining a position of angular rest of said hub with respect to said disc elements, said springs resiliently opposing said hub to move with respect to said disc elements from said rest position, said device comprising a first bearing means on said web portion, a first counter-bearing means on said disc elements, said first bearing and counter-bearing means cooperating in abutment relation for limiting to a first predetermined value the angular stroke in one direction of said hub with respect to said disc elements from said rest position, a second bearing means on said web portion, and a second counter-bearing means on said disc elements, said second bearing and counter-bearing means cooperating in abutment relation for limiting to a second predetermined value the angular stroke in the other direction of said hub with respect to said disc elements from said rest position, said means being constructed and arranged so that said first and second values are different from each other and have a sum greater than 15°.

2. A damper device as defined in claim 1 wherein said web portion includes nose portions and said windows include narrow sides between which both ends of each spring are respectively positioned.

3. A damper device as defined in claim 2 wherein said nose portions are engaged inside said springs.

4. A damper device as defined in claim 1 wherein said first and second bearing means on said web portion are formed by radial faces of slots alternated with respect to said notches.

5. A damper device as defined in claim 1 wherein said first and second counter-bearing means on said disc elements consist of pillars fixing said disc elements to each other and maintaining them axially spaced from each other.

6. A damper device as defined in claim 1 wherein said first value is between 0° and 5°.

7. A damper device as defined in claim 1 wherein said second value is about 20°.

8. A damper device as defined in claim 1 wherein the sum of first and second values is about 25°.

9. A damper device as defined in claim 1 wherein said springs are positioned by noses disposed on said web portion and by said windows.

References Cited in the file of this patent

UNITED STATES PATENTS

| | | |
|---|---|---|
| 2,127,996 | Havill | Aug. 23, 1938 |
| 2,294,638 | Tower | Sept. 1, 1942 |
| 2,507,646 | Reed | May, 16, 1950 |
| 2,513,379 | Thelander | July 4, 1950 |
| 2,571,291 | Reed | Oct. 16, 1951 |
| 2,687,627 | Binder | Aug. 31, 1954 |
| 2,826,901 | Barrenechea | Mar. 18, 1958 |